United States Patent [19]
Robertson et al.

[11] Patent Number: 5,330,651
[45] Date of Patent: Jul. 19, 1994

[54] TREATMENT OF CONTAMINATED AGRICULTURAL RUN-OFF

[75] Inventors: William Robertson; David W. Blowers; Carol J. Ptacek, all of Waterloo, Canada

[73] Assignee: University of Waterloo, Waterloo, Canada

[21] Appl. No.: 879,915

[22] Filed: May 8, 1992

[30] Foreign Application Priority Data

May 10, 1991 [GB] United Kingdom ............... 91 10201

[51] Int. Cl.$^5$ .............................................. C02F 3/28
[52] U.S. Cl. .................................... 210/617; 210/747; 210/170; 210/903
[58] Field of Search ............... 210/603, 605, 615, 617, 210/618, 747, 150, 151, 170, 257.1, 263, 291, 903

[56] References Cited
U.S. PATENT DOCUMENTS

| | | | |
|---|---|---|---|
| 4,086,161 | 4/1978 | Burton | 210/150 |
| 4,086,167 | 4/1978 | Japoln et al. | 210/170 |
| 4,333,837 | 6/1982 | Plosz et al. | 210/257.1 |
| 4,351,729 | 9/1982 | Witt | 210/617 |
| 4,446,025 | 5/1984 | Assaf et al. | 210/747 |
| 4,810,377 | 3/1989 | Kato et al. | 210/150 |
| 4,872,985 | 10/1989 | Dinges | 210/747 |
| 4,919,568 | 4/1990 | Hurley | 210/747 |
| 4,925,552 | 5/1990 | Bateson et al. | 210/150 |
| 5,106,504 | 4/1992 | Murray | 210/170 |

Primary Examiner—Christopher Upton
Attorney, Agent, or Firm—Anthony Asquith & Co

[57] ABSTRACT

Nitrate-polluted run-off water from a field is conveyed via land drains to a reservoir. The reservoir is large enough to contain excess quantities of storm water from the field. From the reservoir, the run-off water enters a tank which contains wood or other organic carbon material. The wood is kept under water, i.e. under anaerobic conditions, whereby the nitrate is broken down by bio-chemical action. Sufficient wood is provided, and the flow rate is so adjusted, that the nitrate-polluted water spends many hours in contact with the wood.

9 Claims, 2 Drawing Sheets

TREATMENT OF CONTAMINATED AGRICULTURAL RUN-OFF

This invention relates to the treatment of run-off water from agricultural fields.

BACKGROUND TO THE INVENTION

One example of a manner in which agricultural run-off water can become contaminated is from the excessive use of fertilizers, particularly chemical fertilizers.

Ideally, a farmer wishes to apply just the right amount of chemical fertilizer: if he applies too little, plant protein production will be affected; if he applies too much, the economy of the operation will be affected. There is, however, a considerable margin between applying a little more fertilizer than the plant can usefully assimilate, and applying so much fertilizer that the plants would actually be poisoned. Economically, the farmer knows that it is far better to err on the side of a little too much fertilizer, than not quite enough.

Slow-release chemical fertilizers therefore tend to be over-applied, with the result that agricultural run-off water can contain substantial quantities of nitrate.

Nitrate pollution of groundwater can also arise from agriculture in the absence of chemical fertilizers; for example, some types of crop cultivation tend naturally to leave excessive nitrate concentrations in the soil, which leaches out into the run-off water. During the non-growing season, nitrogen from plants can become oxidised to nitrate.

Nitrate is a mobile and persistent anion in many groundwater flow systems. It is an especial problem that nitrate can remain intact for long periods in unconfined, shallow, aerobic, sandy, aquifers; when such aquifers are used for drinking water supply, it is a growing problem that the nitrate can exceed the drinking water contamination limit.

One of the difficulties in the effective treatment of the worsening nitrate problem lies in the fact that the nitrate is so diffuse. Any measure aimed at treating the nitrate in the water which it is contaminating, whether this is groundwater in its native aquifer, or water flowing in a river or stream, requires the handling of enormous quantities of water.

It is recognized that the problem might be alleviated to a great extent if the water could be treated actually at the agricultural site, before the nitrate enters the groundwater or other body of water.

It is an aim of the invention to provide a treatment which will break down the nitrate in water washed off an agricultural field, so that when the run-off water passes away from the field the water is substantially nitrate-free.

When a field is naturally well-drained, precipitation water may sink down vertically through the soil under virtually all conditions. The invention is mainly concerned with the treatment of pollution from fields that have drainage ditches and the like. The provision of drainage ditches, to cope with excess run-off water, is commonplace on farms. The use of land-drains, consisting of pipes of porous material inserted a few inches or more below the ground surface, is also common. Excess or storm water collects in the pipes and flows to a collection sump or ditch. Although powered pumping is sometimes utilised, land-drains are generally laid on an incline, whereby the collected water flows naturally to the collection sump, which is situated at a low point of the field. Land-drains may criss-cross a field, and may feed into a number of drainage ditches and collection sumps.

The pollution with which the invention is mainly concerned is that contained in the water that enters drainage ditches, land-drains, and run-off collection sumps.

GENERAL FEATURES OF THE INVENTION

In the invention, run-off water from an agricultural field is collected and conveyed to a collection point for treatment. The water is then passed through a body of material which includes organic carbon material. The body of material is of such porosity or permeability that the water can percolate therethrough. Where the available organic carbon material itself does not have the required degree of porosity, the body may contain a mixture of the organic carbon with such material as gravel, to enhance the porosity of the body. Gravel or the like can be added to, and mixed with, the carbon, as an inert bulk filler, if required. When other materials besides organic carbon are present in the body, sufficient carbon should be included that it can be ensured that the contaminant in the water has a good residence time in operative reactive contact with the carbon.

In the invention, while the water remains in contact with the organic carbon material, the material is maintained under anaerobic conditions.

In relation to the quantity of water collected from the field, the dimensions of the body of material are such that the water percolating through the body remains in the body, and in contact with the organic carbon material, under the anaerobic conditions, for a substantial period of time. The period is long enough that, under this procedure, nitrates dissolved in the water undergo a bio-chemical reduction, and are broken down.

The organic carbon material may be, for example, wood chippings or sawdust. The carbon material disappears as the chemical changes occur, and must be replenished from time to time.

A preferred feature of the invention is the provision of an "agricultural basket", in which to contain the organic carbon material. The agricultural basket normally resides under water in a tank, through which the water to be treated is fed at a gradual rate. The basket serves to contain the carbon material, but the basket is sufficiently porous as to allow water to percolate into and through the carbon material. In some cases it will be practical for the basket to be lifted out of the tank to facilitate the operation of replenishing the organic carbon material. In other cases, it will be possible to insert sufficient carbon in the first instance for the treatment system to operate indefinitely.

Although the invention is described herein mainly as it relates to the breaking down of nitrate, the invention can be useful in treating other chemical contaminants. The invention provides an economical system in which contaminated agricultural run-off water can be treated for the removal of such other contaminants that might be dissolved in agricultural run-off water as, for example, sulphate and selenate. These contaminants can enter the run-off water as a result of the soil being disturbed by tillage, or through irrigation procedures. The use of certain pesticides and herbicides can lead to the presence in run-off water of dissolved reducible contaminants, and the invention can be useful also in breaking these down.

It is an aim of the invention to accomplish the treatment of the contaminants in a reliable manner, yet in a manner which is much less expensive than processes which involve removing water to a treatment facility. In the invention, although the water is caused to move in a directed manner, nevertheless the water is treated substantially in-situ, and the designer can usually arrange that the water passes through the treatment process simply under the action of gravity, basically via a path which the water would follow in any event in undergoing natural drainage from the field.

In particular, in the invention, the water is treated before the contaminants become diluted (which happens when the water enters a stream, or enters an aquifer) which means that the volume of water that has to be treated is kept to a minimum. Because the volumes of water that have to be treated can be kept small, the cost becomes manageable of keeping the water in contact with the treatment material for a substantial residence time. The substantial residence time is needed to ensure completion of the chemical breakdown of the contaminant.

It is contemplated that the invention can be economical in those fields where run-off water has to be pumped away, as distinct from the more usual cases where the water simply drains away under gravity. In this sense, the invention is therefore not applicable only to "passive" drainage systems. It may be noted that a particular feature of the invention is the avoidance of the expense associated with taking large quantities of dilutely-contaminated water out of the ground and moving it to a treatment facility, which would be a large extra expense even in cases where the field drainage system involves pumping the run-off water. The invention is aimed at permitting the run-off water to be treated before spreading out into contact with other bodies of water.

The invention provides an economical treatment system for contaminants of the kind that are removed by the bio-chemical reduction of the contaminant when the water in which the contaminant is dissolved is held for a substantial period in the presence of organic carbon, under anaerobic conditions.

DETAILED DESCRIPTION OF PREFERRED EMBODIMENT

By way of further explanation of the invention, an exemplary embodiment of the invention will now be described with reference to the accompanying drawings, in which.

The apparatus and procedures shown in the accompanying drawings and described below are examples which embody the invention. It should be noted that the scope of the invention is defined by the accompanying claims, and not necessarily by specific features of exemplary embodiments.

Figure 1:
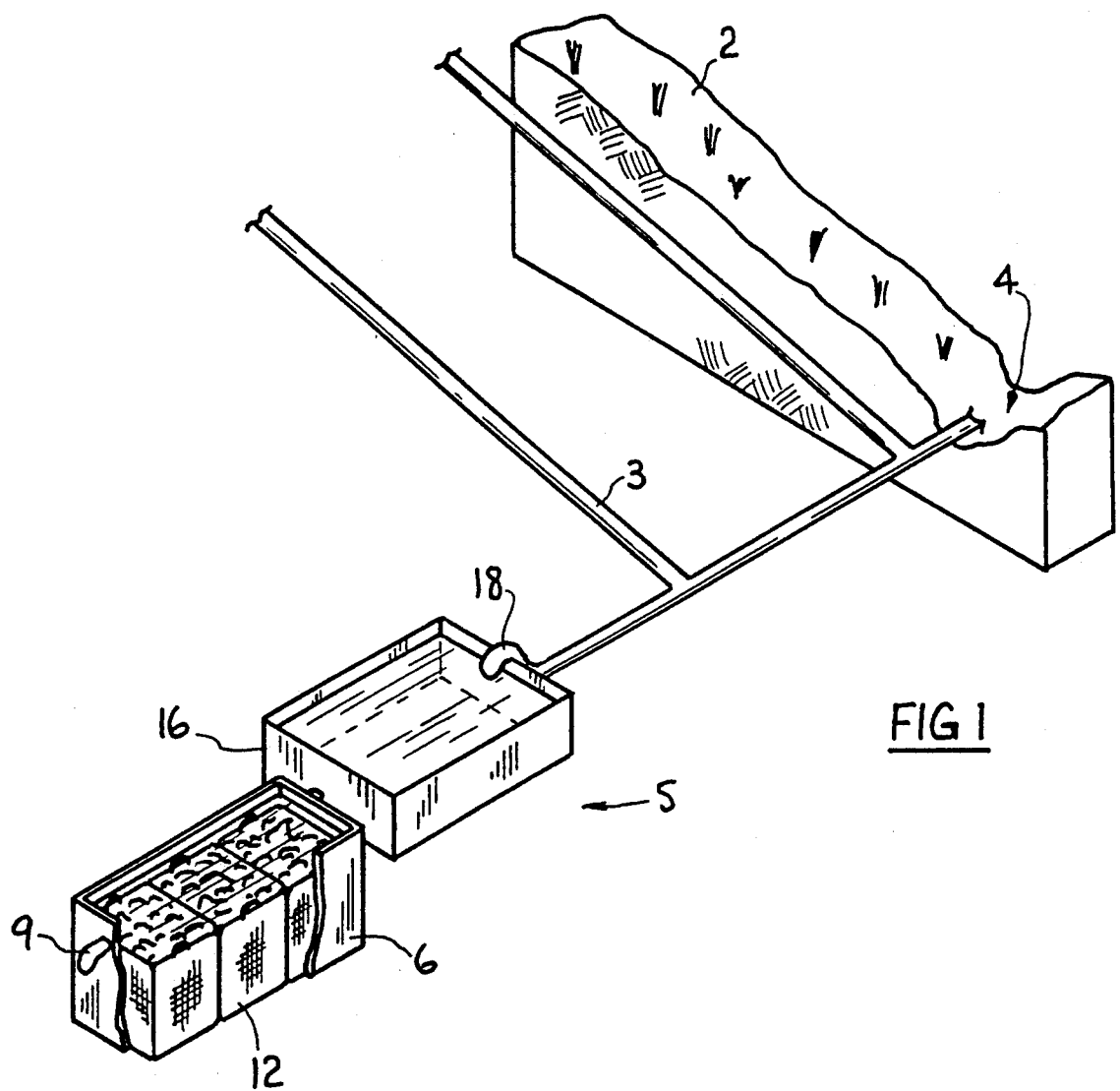
FIG. 1 is a view of a pollution treatment facility in which the procedures of the invention are carried out.
Figure 2:
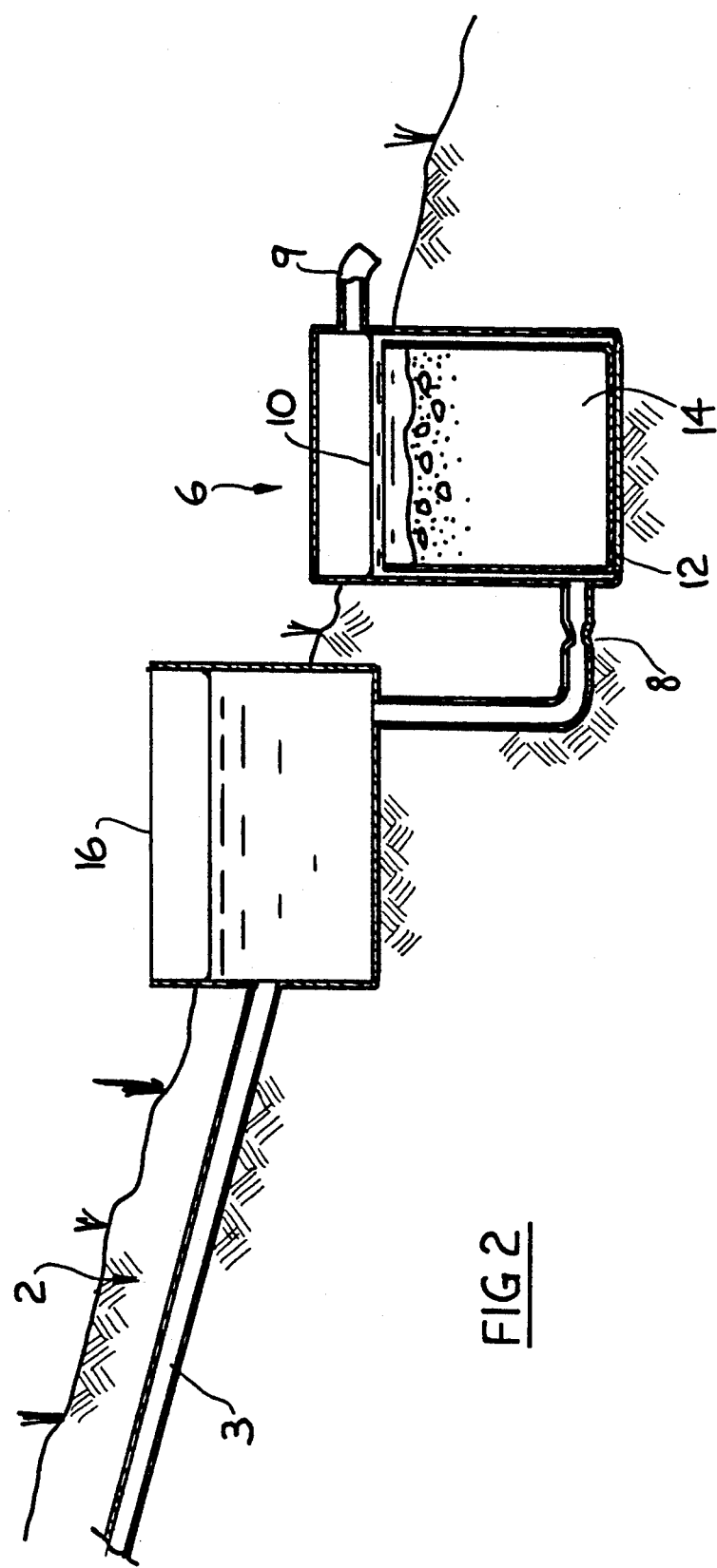
FIG. 2 is a cross-section of some of the components of the system shown in FIG. 1.

FIG. 1 shows a field 2, upon which a chemical fertilizer, such as ammonium nitrate, has been applied.

The field 2 contains land-drains 3. The land-drains 3 may be formed from plastic pipes having many slits or openings, or from porous ceramic material, etc. The land-drains lead to a drainage ditch 4, which in turn leads to a collection sump 5. The sump 5 is located at a low point with respect to the field, so that water collected in the land-drains 3 flows naturally towards the sump 5.

In the sump 5 is a tank 6, which is made of substantially leakproof material, such as concrete, steel, or PVC. The tank may be provided with an openable lid (not shown). Water collecting in the sump 5 enters the tank 6 via an inlet pipe 8. The tank is provided with an outlet pipe or overflow 9.

The overflow 9 is positioned high up on the side of the tank 8, so that the tank 6 is caused to remain full of water, up to the level of the level of the overflow 9, and the water level 10 in the tank is caused to remain constant.

Inside the tank is a basket 12. The basket is made of a geopolymer or geotextile material, which allows water to pass therethrough, and which comprises a highly non-degradable plastic material.

Contained inside the basket 12 is a body of material 14 which includes organic carbon. The organic carbon in the material may be, for example, compost, or silage, or sawdust, or seaweed, etc. The consistency of the material 14 contained within the basket 12 is such that the water entering through the inlet pipe 8 may percolate through the material. If the material is liable to consolidate, i.e. become less permeable, it may be advisable to add gravel or other inert filler, to maintain the correct consistency.

The body of material 14 remains under water, and as such the conditions inside the body of material remain largely anaerobic. That being so, microbial action commences, by which the nitrate in solution in the water tends to be broken down according to the following (exemplary) reaction:

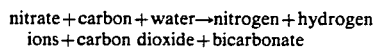
nitrate + carbon + water → nitrogen + hydrogen ions + carbon dioxide + bicarbonate In another reaction, an hydroxide is produced in place of the bicarbonate.

The bicarbonate or hydroxide may combine with other substances present in the water to form a harmless insoluble compound, which precipitates onto the body of carbon material 14.

Of course, water does not flow at a constant rate in the land-drains 3. During and after a rain-storm, water gushes violently from the drains; during dry weather, the flow of water may stop completely. A reservoir 16 is provided for the purpose of keeping a constant supply of water in the tank 6.

The reservoir 16 comprises a storage pond. During a storm, a large volume of water from the ditch 4, or from the land-drains 3, as appropriate, enters the reservoir 16.

Water passes from the reservoir 16 through the pipe 8 into the tank 6. The inlet pipe 8 is of such a construction that the water enters the tank 6 only slowly. The purpose of keeping the flow rate slow is so that the water may spend a substantial period of time in the tank 6, percolating through, and in contact with, the organic carbon material 14. A period of several hours in contact with the carbon is typically required for the de-nitrification reaction to carry through. (The reaction time is affected by such factors as the amount of oxygen in the water, the pH level and temperature of the water, the presence of other substances in the water, etc.)

Thus, the flow rate of water into the reservoir may vary from zero to very rapid. The flow of water out of the reservoir and into the tank preferably should be at a slow, constant rate. The level of water in the tank should not be allowed to fall below the depth at which the carbon might become exposed.

In order to achieve a slow rate of flow through the tank 6, the inlet pipe 8 may include a suitable constriction. Alternatively, the flow through the inlet pipe 8 may be controlled by a timing mechanism of appropriate type, which lets a small volume of water through on a periodic basis. A system of simple float valves will usually be adequate, although pumps, and sophisticated, and even powered, controls may be provided if desired.

The body of organic carbon material 14 in the tank 6 should not be allowed to dry out and become exposed to the atmosphere, even in a drought. Although exposure for a short period would not matter, if the material were to become exposed for a long period it would simply oxidize and would then be of no further use in the treatment of the nitrate pollution. Thus, the reservoir 16 and the tank 6 should be of large enough capacity that the carbon material in the tank remains always submerged, given the desired rate of movement of water through the organic carbon material 14.

In some cases, depending on the particular field, it can happen that a specific reservoir, as such, is not needed; for example if the tank tends never to empty in any event.

The reservoir 16 should be large enough to take all the storm water flow without flooding or overflowing, and without permitting a surge of water to bypass the tank.

Thus the size of the reservoir 16, the size of the tank 6, and the quantity of the material 14, are determined by: the de-nitrification reaction rate; the level of the local water table; the permeability of the soil; the type and amount of fertilizer used; and the local precipitation and other weather conditions bearing in mind such seasonal factors as winter freeze-up, spring run-off, summer drought, etc.

In a field of, for example, 10 hectares in area, and in a climate such as that of Southern Ontario, and with the types of soils found there, a reservoir of capacity 200,000 liters would typically be required. About 1 tonne of sawdust would in that case be needed to constitute the body of material 14.

Periodically, the organic carbon material 14 in the basket 12 will become exhausted and will have to be replaced.

The basket 12 may be made removable for this purpose. The basket is lifted out, the spent material disposed of, and a basket of new material is replaced. The basket is of such design that it can be readily handled (using a mechanical handler) and a typical basket might contain 1000 kg of porous material containing organic carbon.

On the other hand, although the material is submerged, it is often not difficult simply to excavate the material, and dump fresh material into the water, so that a specific basket structure to contain the organic carbon is not essential.

If the disposition of the field so permits, the reservoir and the tank can be less specifically structured. For example, the invention can be carried out very economically under the following circumstances, in that very little construction and excavation is required at the site: where the field has a ditch; where conditions are such that the ditch substantially never dries out, and substantially never floods; where run-off water remains in the ditch for long periods; where the organic carbon is simply placed in the ditch; and where the water in the ditch is deep enough to ensure that the organic carbon remains always submerged.

The anaerobic de-nitrification reaction in the presence of carbon is a micro-biological reaction, and requires the presence of suitable micro-organisms. These can be pre-cultured and added to the organic carbon material, as may be necessary.

We claim:

1. Water contamination-treatment apparatus for use in an agricultural field, wherein:

the apparatus includes a tank, and a body containing organic carbon material, which is sufficiently porous as to allow water to percolate therethrough, the said body being contained within the tank;

the apparatus includes a reservoir, and means for collecting precipitation water running off the field, and for conveying the water into the reservoir;

the apparatus includes means for conveying the water in the reservoir into the tank;

the apparatus includes means for maintaining a level of water in the tank at a predetermined level, the said level being such that the body containing carbon material remains submerged below the water substantially all the time;

the means for conveying the water into the tank is so arranged that the water passes into and through the tank only slowly and gradually, and wherein the tank is sized such that the water passing through the tank remains in the tank for a period of at least a few hours, the period being long enough for nitrate compounds dissolved in the water to undergo substantially complete reduction;

the reservoir is of such capacity, in relation to the size of the field and the anticipated rates of precipitation, as to receive and contain a sufficient volume of run-off water that the reservoir substantially never floods;

and the arrangement of the apparatus is such that water running off the field by natural drainage under gravity, substantially without the use of a powered pump, can flow naturally from the means for collecting the water, thence into and through the reservoir, and thence into and through the body containing carbon material submerged in the tank.

2. Apparatus of claim 1, wherein, for each 10 hectares of the field, the reservoir has a capacity of 200,000 liters, and the body of material contains 1 tonne of organic carbon.

3. Procedure for treating contamination in agricultural run-off water, wherein:

the procedure is carried out in or adjacent to an agricultural field;

the agricultural field is of the kind in which run-off water from the field drains naturally, under gravity, to a run-off water collection point, located in or adjacent to the field;

the procedure includes the step of providing a receptacle at the collection point;

the procedure includes the step of providing in the receptacle a body of material;

the procedure includes the step of so arranging the body of material in the receptacle, and of so directing the flow of run-off water, that the water, in flowing naturally under gravity, and substantially without the use of a powered pump, enters the receptacle, percolates through the body of material contained therein, and then passes out from the receptacle;

the body of material comprises or includes solid pieces of organic carbon material;

the nature of the receptacle is such that the solid pieces of organic carbon material are contained and confined therein;

the body of material is of such permeability that the run-off water can percolate through the body;

in relation to the quantity of run-off water collected, the dimensions of the body of material are such that the water percolating through the body remains in the body, and in contact with the pieces of organic carbon material, for a substantial period of time;

the procedure includes the step of providing an inlet and an outlet in respect of the receptacle, through which the run-off water enters and leaves the receptacle;

the procedure includes the step of so directing the flow of run-off water, and of arranging the receptacle to be of such capacity and dimensions, and of arranging the positions of the inlet and the outlet, that the carbon material in the receptacle remains substantially always covered with water, and remains so even during periods when the flow of water entering the receptacle is zero or nearly zero, whereby the body of material is maintained under anaerobic conditions;

and wherein the substantial period of time is long enough for nitrate compounds dissolved in the water to undergo substantially complete reduction.

4. Procedure of claim (2)3, wherein the substantial period of time is at least several hours.

5. Procedure of claim 3, wherein the organic carbon material is wood.

6. Procedure of claim 3, wherein the field is provided with land-drains, arranged in a suitable network over the field, and the land-drains are effective to conduct the run-off water, by natural drainage and without the use of a powered pump, to the collection point.

7. Procedure of claim 3, wherein:

the procedure includes the step of providing a reservoir; the procedure includes the step of conducting the run-off water collected at the collection point, by natural drainage and without the use of a powered pump into the reservoir;

the procedure includes the step of providing a means for conveying the said water from the reservoir into the receptacle;

and the reservoir is of such capacity, in relation to the size of the field, and the anticipated rates of precipitation, as to receive and contain a sufficient volume of run-off water that the reservoir substantially never floods.

8. Procedure of claim 7, wherein the procedure includes the step of providing the inlet with a constriction whereby water from the reservoir passes through the inlet into the receptacle only slowly and gradually.

9. Procedure of claim 3, wherein:

the body containing organic carbon material is confined within a basket, the basket being made of porous material, and wherein the construction of the basket and the arrangement of the receptacle is such that the basket, with the carbon material contained therein, can be lifted out from the receptacle.

* * * * *